United States Patent
Belvo et al.

(10) Patent No.: US 6,895,323 B2
(45) Date of Patent: May 17, 2005

(54) BRAKE CONTROL METHOD UTILIZING A CONTROLLED CENTER DIFFERENTIAL

(75) Inventors: Todd A. Belvo, White Lake, MI (US); Eric E. Krueger, Ann Arbor, MI (US); Kevin A. O'Dea, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 96 days.

(21) Appl. No.: 10/370,001

(22) Filed: Feb. 20, 2003

(65) Prior Publication Data

US 2004/0167700 A1 Aug. 26, 2004

(51) Int. Cl.$^7$ ............................................. G06F 7/00
(52) U.S. Cl. ............................................. 701/71
(58) Field of Search ........................... 701/71, 74, 82, 701/88

(56) References Cited

U.S. PATENT DOCUMENTS

| | | | |
|---|---|---|---|
| 5,627,751 A | * 5/1997 | Davis et al. | ................. 701/129 |
| 6,161,905 A | 12/2000 | Hac et al. | |
| 6,169,951 B1 | 1/2001 | Ghoneim et al. | |
| 6,212,460 B1 | 4/2001 | Rizzo et al. | |
| 6,247,766 B1 | 6/2001 | Subramanian et al. | |
| 6,325,469 B1 | 12/2001 | Carson et al. | |
| 6,327,935 B1 | * 12/2001 | Joslin et al. | ................. 74/650 |
| 6,454,365 B1 | 9/2002 | Arwine et al. | |
| 6,456,921 B1 | 9/2002 | Bodie et al. | |
| 6,533,369 B2 | 4/2003 | Guay | |
| 6,547,343 B1 | 4/2003 | Hac | |

* cited by examiner

Primary Examiner—Yonel Beaulieu
(74) Attorney, Agent, or Firm—Michael D. Smith

(57) ABSTRACT

A method is directed to controlling a differential within an active antilock brake system. The method provides for receiving a secondary axle wheel speed, receiving a vehicle speed, determining a difference value between the vehicle speed and the secondary axle wheel speed, and activating the differential responsive to the difference value. The step of activating the differential responsive to the difference value may include steps for comparing the difference value to a threshold value and activating the differential based on the comparison. The step of activating the differential based on the comparison may include steps for determining a differential request value based on the comparison, activating the differential responsive to the differential request value when the differential request value is less than a maximum differential request value, and activating the differential responsive to the maximum differential request value when the differential request value exceeds the maximum differential request value.

26 Claims, 2 Drawing Sheets

BRAKE CONTROL METHOD UTILIZING A CONTROLLED CENTER DIFFERENTIAL

FIELD OF THE INVENTION

The technical field of this disclosure is controlled brake systems that perform anti-lock brake systems (ABS), traction control systems (TCS), and vehicle stability enhancement (VSES) functions. More particularly, the technical field of this disclosure is controlled brake systems within drive systems utilizing a controllable differential.

BACKGROUND OF THE INVENTION

Control of brake systems is an important aspect of automotive functionality. Two common controlled brake system functions are ABS and TCS. TCS events occur when traction is lost while the vehicle is accelerating. ABS events occur when traction is lost while the vehicle is braking.

During anti-lock braking (ABS) events, it is important to keep a rear axle within two-wheel drive (2WD) systems, a non-engaged axle within front-wheel drive (FWD) systems, or a non-powered axle within all-wheel-drive (AWD) systems at or near vehicle speed in order to not degrade vehicle stability. If the speed of the rear/non-engaged/non-powered axle is reduced too much, the lateral capability of the tires connected to the axle and the roadway is reduced.

Under normal circumstances, rear/non-engaged/non-powered wheel speeds will recover to vehicle speed after brake pressure is released. Unfortunately, if the coefficient of friction of the road surface is low the wheels may not recover quickly.

Various methods exist for forcing the wheels to recover more quickly. One such method for rear wheel drive vehicles equipped with electronic throttle control (ETC) includes increasing engine torque slightly to force the rear wheel speeds to increase. Unfortunately, increasing engine torque too much may result in rear wheel spin and a corresponding reduction of vehicle stability.

During a TCS event it is important to regulate the driven wheels speeds to a level that maximizes vehicle acceleration while maintaining vehicle stability and steerablity. The appropriate level of the driven wheel speed is slightly faster than the true reference velocity of the vehicle. Thus is it important that an accurate estimate of the true reference velocity of the vehicle be known. On an AWD vehicle, in which both axles are powered, the calculation of a vehicle reference velocity is complicated when all 4 of the wheels are spinning excessively. Various methods exist for calculating vehicle reference velocity in this situation. Once such method uses a longitudinal accelerometer to obtain an estimate of the vehicle reference velocity. Unfortunately, this method is subject to inaccuracies due to road grades and sensor signal disturbances on rough roads.

It would be desirable, therefore, to provide a system that would overcome these and other disadvantages.

SUMMARY OF THE INVENTION

One aspect of the invention provides a method for controlling a differential within a controlled brake system by receiving a secondary axle wheel speed, receiving a vehicle speed, determining a difference value between the vehicle speed and the secondary axle wheel speed, and engaging the differential responsive to the difference value.

In accordance with another aspect of the invention, a computer readable medium storing a computer program includes: computer readable code for receiving a secondary axle wheel speed; computer readable code for receiving a vehicle speed; computer readable code for determining a difference value between the calculated vehicle speed and the secondary axle wheel speed; and computer readable code for engaging the differential responsive to the difference value.

In accordance with yet another aspect of the invention, a system for controlling a differential within a controlled brake system is provided. The system includes means for receiving a secondary axle wheel speed. The system further includes means for receiving a calculated vehicle speed. The system additionally includes means for determining a difference value between the calculated vehicle speed and the secondary axle wheel speed. Means for engaging the differential responsive to the difference value is also provided.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices. The term "signal" means either a voltage or current signal.

DETAILED DESCRIPTION OF THE PRESENTLY PREFERRED EMBODIMENT

Figure 1:
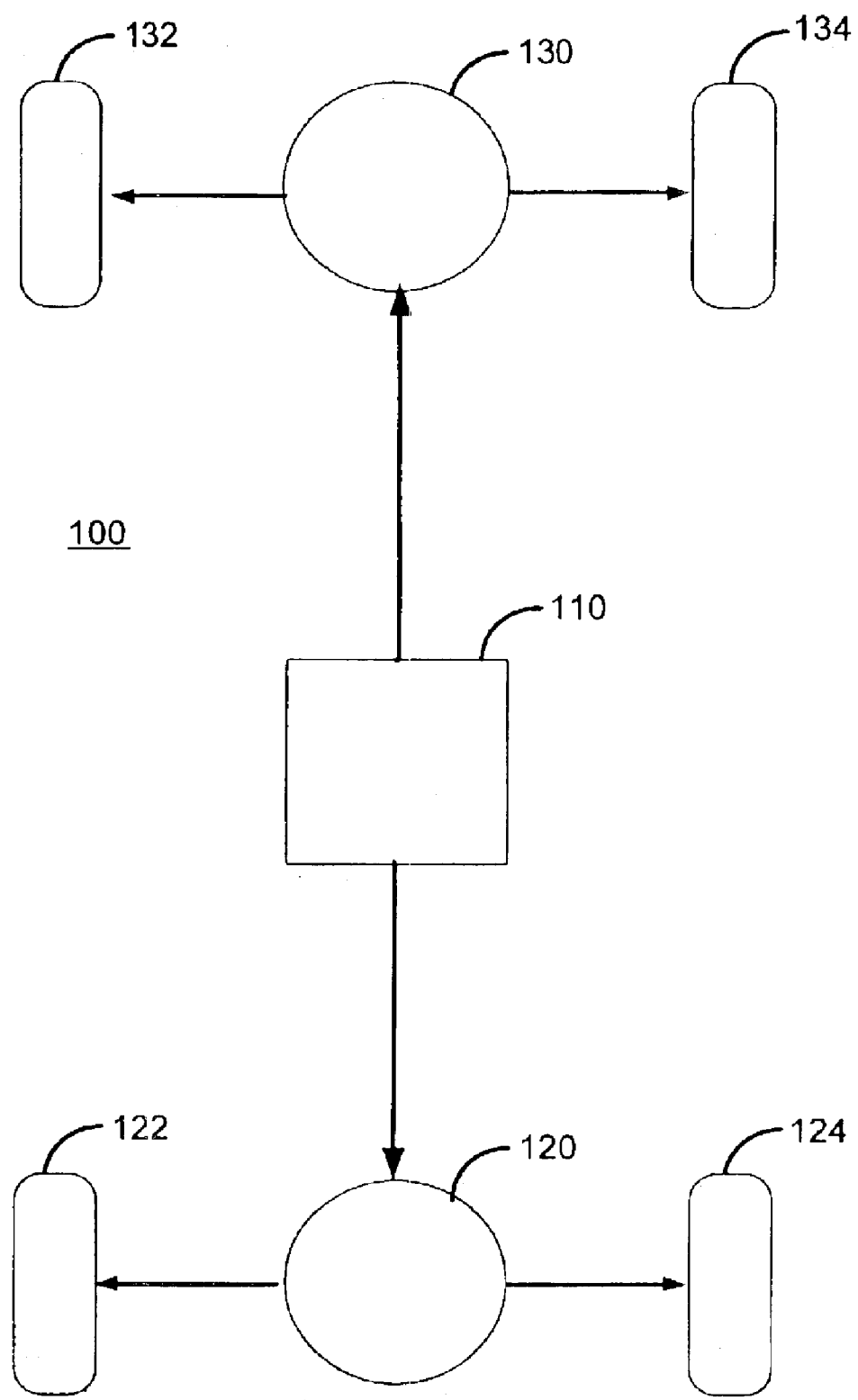
FIG. 1 is a block diagram illustrating an all-wheel drive system, including a center differential, according to one embodiment of the present invention.

FIG. 1 is a block diagram illustrating a vehicle drive system 100, including a center differential, according to one embodiment of the present invention. In FIG. 1, vehicle drive system 100 includes controllable differential 110, rear transfer case 120, front transfer case 130, and wheel units (122, 124, 132, and 134). Each wheel unit (122, 124, 132, and 134) includes a wheel speed sensor (not shown) and a brake control mechanism (not shown), as part of an ABS system, capable of modulating brake force by some combination of hydraulic and or electromechanical means. In an example, the ABS is implemented as a DBC7.2 Controlled Brake System available from Delphi Corp. of Troy, Mich. USA.

A combination of a transfer case and associated wheel units is called an axle. For example, the combination of front transfer case 130 and wheel unit (132, 134) is called a front axle, and the combination of rear transfer case 120 and wheel unit (122, 124) is called a rear axle.

Controllable differential 110 is mechanically coupled to rear transfer case 120 and front transfer case 130. Each transfer case is mechanically coupled to an associated set of wheel units. In one embodiment, controllable differential 110 is electrically coupled to system controller 140 and is mechanically coupled to an engine (not shown).

In operation, controllable differential 110 receives instructions from system controller 140 and power from the engine (not shown). Controllable differential 110 provides torque to one or more transfer cases based on the received instructions. In an example, controllable differential 110 is implemented as an active transfer case available from Magna Steyr of Graz, Austria. In another embodiment, system controller 140 is included within the differential In one embodiment, vehicle drive system 100 is implemented as a front-wheel drive (FWD) system including the capability of engaging the rear wheels utilizing a controllable center differential and thereby transitioning to an all-wheel-drive (AWD) system. In other embodiments, the controllable differential is located in other locations for design purposes, such as, closer to the rear transfer case 120 or closer to the front transfer case 130. In another embodiment, vehicle drive system 100 is implemented as an all-wheel drive (AWD) system.

In operation, when vehicle drive system 100 is implemented as a front-wheel drive (FWD) system including the capability of engaging the rear wheels, vehicle drive system 100 operates in a front wheel drive configuration by default. That is, in the absence of any front wheel spin or any torque coupling commands, all available torque is supplied to the front axle to be distributed to the front wheels. However, when the front wheels spin or a torque coupling command is received, the rear axle and associated wheels are engaged accordingly.

When vehicle drive system 100 is implemented as an all-wheel drive (AWD) system, vehicle drive system 100 operates in a split drive configuration by default. That is, in the absence of any wheel spin or any torque coupling commands, the torque is split by some fixed percentage between the front and rear axles, for example 40% front and 60% rear. However, a torque coupling command in response to wheel spin can reduce the amount of torque sent to the rear, and increase the amount of torque to the front. Conversely, a torque coupling command in response to wheel spin can reduce the amount of torque sent to the front, and increase the amount of torque to the rear.

System controller 140 is a control device designed to monitor and receive data from various sources, process the received data, and transmit a control signal. In one embodiment, system controller 140 includes hardware and software to implement some or all of the functionality detailed below.

In an example, vehicle drive system 100 includes system controller 140 having a supervisory controller electrically coupled to a brake controller (not shown). Alternatively, the brake controller is included within the supervisory controller. In this embodiment, the supervisory controller receives wheel speed inputs and calculates vehicle speed based on the received wheel speed inputs. The supervisory controller additionally determines coupling levels of the controllable differential to improve recovery of secondary axle wheel speeds during ABS events and provides for the use of the secondary axle to calculate a reference velocity during a TCS event. The supervisory controller also receives and responds to torque coupling requests from the brake controller.

In another embodiment, controllable differential 110 includes system controller 140 having all hardware and software necessary to implement vehicle drive system 100 control. In an example, the supervisory controller functionality is performed by a controller within controllable differential 110, called a differential controller. The differential controller performs differential torque coupling during wheel spin and responds to torque coupling requests from the brake controller. In this example, the coupling requests may be used to improve acceleration or stability, or for improving recovery of rear wheels speeds during ABS, or for providing the use of the rear wheels to calculate a reference velocity during a TCS event. In this embodiment, the brake controller provides wheel speeds, vehicle speed, and control brake system functions. In an example, the brake controller communicates torque coupling requests to the differential controller.

The brake controller (not shown) includes hardware and software necessary to implement all of the controlled brake system functions, including vehicle speed computations and ABS and TCS functions. In an example, the differential controller and the brake controller are electrically coupled by a communications link. In an example, the communications link is implemented utilizing a high-speed serial data bus. In another example, the communications link is implemented utilizing a hardware PWM line. The brake controller is designed to transmit a torque coupling request to the differential controller. The differential controller is designed to respond to the received torque coupling request.

In another embodiment, system controller 140 includes the software necessary to calculate a vehicle speed based on a secondary axle wheel speed. In an example, system controller 140 is implemented as a central processing unit (CPU) and includes accompanying devices, such as PROMs, and software programming enabling the CPU to conduct operations. Additionally, the system controller includes a database having a matrix defining several minimum and maximum values, such as, for example a maximum differential request value, a minimum differential value, and a threshold value.

In an example, vehicle drive system 100 is implemented as a FWD system including a functional rear axle. Front transfer case 130 and associated wheel units are identified as part of a primary axle, and rear transfer case 120 and associated wheel units are identified as part of a secondary axle. In this example, controllable differential 110 receives instructions from system controller 140 and power from an engine (not shown). Controllable differential 110 provides power to front transfer case 130 based on the received instructions. The provided power is then distributed to the wheel units (132, 134). Additionally, controllable differential 110 may engage rear transfer case 120 to control wheel units (122, 124).

In another example, vehicle drive system 100 is implemented as an AWD system. Either transfer case and associated wheel units performs primary axle function. The remaining transfer case and associated wheel units perform secondary axle function. In this example, controllable differential 110 receives instructions from system controller 140 and power from an engine (not shown). Controllable differential 110 provides power to the primary axle and engages the secondary axle as instructed, to enhance control of the vehicle. In another example, system controller 140 is included within the differential.

In another embodiment, controllable differential 110 within vehicle drive system 100 is used to determine vehicle speed. In this embodiment, vehicle speed determination is based on a received secondary axle wheel speed. In an example, controllable differential 110 is periodically instructed to temporarily disengage the secondary axle to allow the associated wheels to achieve an actual vehicle speed. A vehicle speed value is then determined, for example by controllable differential 110, and identified as the secondary axle wheel speed. This method of obtaining vehicle speed is referred to as differential disengagement.

The collected secondary axle wheel speed is then conditioned, such as, for example by profile filtering, rate limiting, concurrent system use filtering, or noise filtering to provide a vehicle speed. The conditioning methods are applied individually, or in any suitable combination and may be implemented within system controller 140 or within controllable differential 110.

Figure 2:
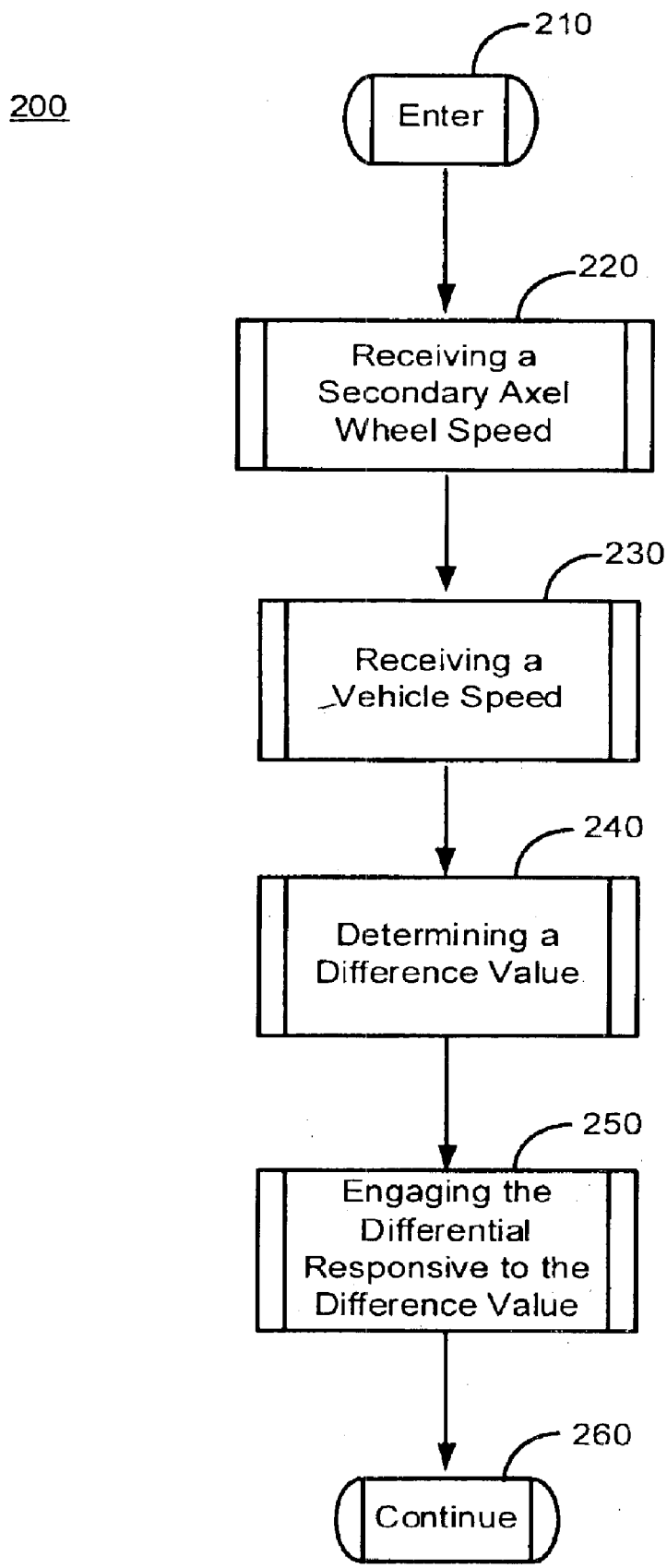
FIG. 2 is a flow diagram illustrating a brake control method utilizing a controllable differential according to an embodiment of the present invention.

FIG. 2 is a flow diagram illustrating a method 200 for controlling a differential within an active antilock brake system according to an embodiment of the present invention. Method 200 may utilize one or more systems detailed in FIG. 1, above.

Method 200 begins at block 210. At block 220, a secondary axle wheel speed is received. In one embodiment, the secondary axle wheel speed is composed of a right wheel speed and a left wheel speed. The two wheel speeds are compared and a minimum wheel speed is identified as the secondary axle wheel speed. In an example, the secondary axle wheel speed is received by disengaging the secondary axle from the differential responsive to a control signal, receiving a left wheel speed of the secondary axle, receiving a right wheel speed of the secondary axle, comparing the left wheel speed to the right wheel speed, and determining the secondary axle wheel speed based on the comparison.

In this example, the control signal includes a disengagement instruction, a timing instruction based on a vehicle acceleration rate, and a reengagement instruction. The timing instruction is based on the acceleration rate of the vehicle. For example, when a vehicle is accelerating rapidly the speed must be updated more often.

The system controller determines time between control signal data update requests based on a driving surface coefficient of friction and a user selected drive configuration, such as, FWD or AWD. For example, disengagement of the secondary axle within a vehicle drive system in single axle drive and on a surface with a higher coefficient of friction would result in a more noticeable absence of the secondary axle from control of the vehicle.

At block 230, a vehicle speed is received. In one embodiment, receiving the vehicle speed includes receiving the secondary axle wheel speed, and conditioning the secondary axle wheel speed. In an example, the secondary axle wheel speed is received as detailed in block 220 above. Conditioning the secondary axle wheel speed includes utilizing one or more methods, such as, for example profile filtering, rate limiting, concurrent system use filtering, and noise filtering. In this example, the conditioning methods are applied individually, or in any suitable combination and may be implemented within the differential or within the system controller.

In another embodiment, receiving the vehicle speed includes receiving data from a longitudinal accelerometer and conditioning the received data. In an example, the longitudinal accelerometer is available from Systron Donner Interial Division of BEI Technologies Inc of San Francisco, Calif. USA. Conditioning the received data includes utilizing one or more methods, such as, for example profile filtering, rate limiting, concurrent system use filtering, and noise filtering. In this example, the conditioning methods are applied individually, or in any suitable combination and may be implemented within the differential or within the system controller.

At block 240, a difference value between the vehicle speed and the secondary axle wheel speed is determined. In one embodiment, during a TCS event, the rear axle wheel speed is compared to the vehicle reference speed and the difference value is determined. In an example, when the difference value exceeds the threshold value, the wheel is spinning excessively and is no longer a valid input for a vehicle speed calculation.

In another embodiment, during an ABS event, the rear axle wheel speed is compared to the vehicle reference speed and the difference value is determined. In an example, when the difference value is less than the threshold value, the rear wheels are not recovering.

At block 250, the controllable differential is activated responsive to the difference value. In one embodiment, engaging the controllable differential based on the comparison includes determining a differential request value based on the comparison, engaging the controllable differential responsive to the differential request value when the controllable differential request value is less than a maximum differential request value, and engaging the controllable differential responsive to the maximum differential request value when the differential request value exceeds the maximum differential request value.

In this embodiment, determining the differential request value includes determining a proportional differential value as the differential request value when the difference value exceeds the threshold value, and determining a minimum differential value as the differential request value when the difference value is less than the threshold value.

In an example, during a TCS event, the controllable differential is activated to disengage the secondary axle.

In another example, during an ABS event, the controllable differential is activated to engage the secondary axle and supply additional torque. The amount of engagement requested is proportional to a difference between the vehicle speed and the secondary axle speed. Method 200 then advances to block 260 where the method ends.

The above-described method of controlling a differential within an active antilock brake system is an example method. The method of controlling a differential within an active antilock brake system illustrates one possible approach for controlling a differential within an active antilock brake system. The actual implementation may vary from the electronic package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

What is claimed is:

1. A method of controlling a differential within a controlled brake system, the method comprising:

activating the differential coupled to a secondary axle responsive to a control signal;

receiving a left wheel speed of the secondary axle and a right wheel speed of the secondary axle;

comparing the left wheel speed to the right wheel speed;

assigning the left wheel speed as the secondary axle wheel speed when the left wheel speed is greater than the right wheel speed;

assigning the right wheel speed as the secondary axle wheel speed when the right wheel speed is greater than the left wheel speed;

receiving a vehicle speed;

determining a difference value between the vehicle speed and the secondary axle wheel speed; and activating the differential responsive to the difference value.

2. The method of claim 1, wherein the control signal comprises:

a disengagement instruction;

a timing instruction based on a vehicle acceleration rate; and a reengagement instruction.

3. The method of claim 1, wherein receiving the vehicle speed comprises:

receiving the secondary axle wheel speed; and conditioning the secondary axle wheel speed.

4. The method of claim 3, wherein conditioning the secondary axle wheel speed includes one or more methods selected from the group consisting of: profile filtering, rate limiting, concurrent system use filtering, and noise filtering.

5. The method of claim 1, wherein receiving the vehicle speed comprises:

receiving data from a longitudinal accelerometer; and conditioning the received data.

6. The method of claim 5, wherein conditioning the received data includes one or more methods selected from the group consisting of: profile filtering, rate limiting, concurrent system use filtering, and noise filtering.

7. The method of claim 1, wherein activating the differential responsive to the difference value comprises:

comprising the difference value to a threshold value; and activating the differential based on the comparison.

8. The method of claim 7, wherein activating the differential based on the comparison comprises:

determining a differential request value based on the comparison;

activating the differential responsive to the differential request value when the differential request value is less than a maximum differential request value; and activating the differential responsive to the maximum differential request value when the differential request value exceeds the maximum differential request value.

9. The method of claim 8, wherein determining the differential request value comprises:

determining a proportional differential value as the differential request value when the difference value exceeds the threshold value; and determining a minimum differential value as the differential request value when the difference value is less than the threshold value.

10. A method of controlling a differential within a controlled brake system, the method comprising:

receiving a secondary axle wheel speed;

receiving a vehicle speed;

determining a difference value between the vehicle speed and the secondary axle wheel speed;

comparing the difference value to a threshold value;

determining a differential request value based on the comparison;

activating the differential responsive to the differential request value when the differential request value is less than a maximum differential request value; and activating the differential responsive to the maximum differential request value when the differential request value exceeds the maximum differential request value.

11. The method of claim 10, wherein receiving the secondary axle wheel speed comprises:

activating the differential coupled to a secondary axle responsive to a control signal;

receiving a left wheel speed of the secondary axle;

receiving a right wheel speed of the secondary axle;

comparing the left wheel speed to the right wheel speed; and determining the secondary axle wheel speed based on the comparison.

12. The method of claim 11, wherein the control signal comprises:

a disengagement instruction;

a timing instruction based on a vehicle acceleration rate; and a reengagement instruction.

13. The method of claim 11, wherein determining the secondary axle wheel speed based on the comparison comprises:

assigning the left wheel speed as the secondary axle wheel speed when the left wheel speed is greater than the right wheel speed; and assigning the right wheel speed as the secondary axle wheel speed when the right wheel speed is greater than the left wheel speed.

14. The method of claim 10, wherein receiving the vehicle speed comprises:

receiving the secondary axle wheel speed; and conditioning the secondary axle wheel speed.

15. The method of claim 14, wherein conditioning the secondary axle wheel speed includes one or more methods selected from the group consisting of: profile filtering, rate limiting, concurrent system use filtering and noise filtering.

16. The method of claim 10, wherein receiving the vehicle speed comprises:

receiving data from a longitudinal accelerometer; and conditioning the received data.

17. The method of claim 16, wherein conditioning the received data includes one or more methods selected from the group consisting of: profile filtering, rate limiting, concurrent system use filtering, and noise filtering.

18. A computer readable medium storing a computer program comprising:

computer readable code for activating the differential coupled to a secondary axle responsive to a control signal;

computer readable code for receiving a left wheel speed of the secondary axle and for receiving a right wheel speed of the secondary axle;

computer readable code for comparing the left wheel speed to the right wheel speed;

computer readable code for assigning the left wheel speed as the secondary axle wheel speed when the left wheel speed is greater than the right wheel speed;

computer readable code for assigning the right wheel speed as the secondary axle wheel speed when the right wheel speed is greater than the left wheel speed computer readable code for receiving a vehicle speed;

computer readable code for determining a difference value between the calculated vehicle speed and the secondary axle wheel speed; and computer readable code for activating the differential responsive to the difference value.

19. The computer readable medium of claim 18, wherein the control signal comprises:
- a disengagement instruction;
- a timing instruction based on a vehicle acceleration rate; and
- a reengagement instruction.

20. The computer readable medium of claim 18, wherein the computer readable code for receiving the vehicle speed comprises:
- computer readable code for receiving the secondary axle wheel speed; and
- computer readable code for conditioning the secondary axle wheel speed.

21. The computer readable medium of claim 20, wherein the computer readable code for conditioning the secondary axle wheel speed includes one or more methods selected from the group consisting of: profile filtering, rate limiting, concurrent system use filtering, and noise filtering.

22. The computer readable medium of claim 18, wherein the computer readable code for receiving the vehicle speed comprises:
- computer readable code for receiving data from a longitudinal accelerometer; and
- computer readable code for conditioning the received data.

23. The computer readable medium of claim 22, wherein the computer readable code for conditioning the received data includes one or more methods selected from the group consisting of: profile filtering, rate limiting, concurrent system use filtering, and noise filtering.

24. The computer readable medium of claim 18, wherein the computer readable code for activating the differential responsive to the difference value comprises:
- computer readable code for comparing the difference value to a threshold value; and
- computer readable code for activating the differential based on the comparison.

25. The computer readable medium of claim 24, wherein the computer readable code for activating the differential based on the comparison comprises:
- computer readable code for determining a differential request value based on the comparison;
- computer readable code for activating the differential responsive to the differential request value when the differential request value is less than a maximum differential request value; and
- computer readable code for activating the differential responsive to the maximum differential request value when the differential request value exceeds the maximum differential request value.

26. The computer readable medium of claim 25, wherein the computer readable code for determining the differential request value comprises:
- computer readable code for determining a proportional differential value as the differential request value when the difference value exceeds the threshold value; and
- computer readable code for determining a minimum differential value as the differential request value when the difference value is less than the threshold value.

* * * * *